US006772292B2

(12) United States Patent
Garber et al.

(10) Patent No.: US 6,772,292 B2
(45) Date of Patent: Aug. 3, 2004

(54) TWO AREA STACK

(76) Inventors: Isaak Garber, 69 Ave. O, Apt. #A8, Brooklyn, NY (US) 11204; Gordon Stuart Bassen, 1230 Ave. X, Apt. #6H, Brooklyn, NY (US) 11235

( * ) Notice: Subject to any disclaimer, the term of this patent is extended or adjusted under 35 U.S.C. 154(b) by 219 days.

(21) Appl. No.: 10/161,872

(22) Filed: Jun. 4, 2002

(65) Prior Publication Data

US 2003/0225973 A1 Dec. 4, 2003

(51) Int. Cl.[7] .......... G06F 12/00
(52) U.S. Cl. .......... 711/132; 711/170
(58) Field of Search .......... 711/132, 170, 711/173

(56) References Cited

U.S. PATENT DOCUMENTS 6,453,466 B1 * 9/2002 Eidt .......... 717/162
6,532,531 B1 * 3/2003 O'Connor et al. .......... 712/202
2002/0083416 A1 * 6/2002 Click et al. .......... 717/120

* cited by examiner

*Primary Examiner*—Matthew Kim
*Assistant Examiner*—Shane M Thomas

(57) ABSTRACT

The present invention provides a unique stack memory system to store the execution environment, including registers in one area and local variables and parameters of functions in a different area so that every function creates its own portion in the stack. These portions include two pointers, one for referencing the portion of the previous function and the other for referencing either the portion of the next function or the free space of the stack. This structure permits the run-time creation of variables, while also enabling the deletion of both run-time and compile-time created variables without storage fragmentation.

6 Claims, 3 Drawing Sheets

TWO AREA STACK

CROSS-REFERENCE TO RELATED APPLICATIONS

Not Applicable

BACKGROUND

1. Field of Invention

The present invention relates generally to a compiler that uses stack-based memory.

2. Description of Prior Art

Currently compilers used in computer programs for high-level language compilation use a stack structure for storing registers, parameters, and local variables. The data is always kept in fixed size memory for local variables. There exist computer systems, which have multi-stack memory architectures where local variables and registers are placed in two different stacks, as in U.S. Pat. No. 6,138,210 (2000). These fixed size local variable and register areas however, do not allow for the creation of run-time variables in the stack. Existing compilers create run-time variables in separate memory locations that are referred to as the heap, as is found in the C++ language compiler.

If the size of the local variable area is known at the moment when a subprogram is to be called, the area can be created in the stack as described by Fischer and LeBlanc in "Crafting a Compiler with C", Benjamin/Cummings Publishing Co. Inc., 1991, pp. 289–292, Redwood City, Calif., ISBN 0-8053-2166-7. However at execution time a function cannot create any additional area in the stack and the necessity of the heap remains.

Having two different locations for local variables allocated during compilation and at run-time creates additional complexities in high-level languages. This is especially true for object-oriented programming languages where large numbers of run-time variables are created. As run time variables are deleted fragmentation of the heap can occur.

SUMMARY

Accordingly, the present invention provides a mechanism to change the stack area that is given for local variables so that both compile time and run time local variables can be created in the stack. This was considered an insoluble problem. It also becomes possible to delete compile time created variables at run time. This problem had not been recognized in the prior art.

As a consequence the use of the heap is no longer necessary and fragmentation no longer occurs.

DRAWING FIGURES

DRAWING NUMERALS

40—base pointer

50—first pointer of function $f_n$.

60—second pointer of function $f_n$.

70—local variable and parameter area of function $f_n$.

80—first pointer of function $f_{n+1}$.

90—second pointer of function $f_{n+1}$.

100—local variable and parameter area of function $f_{n+1}$.

105—storage area for run time generated variables

110—execution environment

115—local variable and parameter area for all functions

120—first pointer of the main function

130—second pointer of the main function

140—local variable and parameter area of the main function

150—first pointer of function $f_1$

160—second pointer of function $f_1$

170—local variable and parameter area of function $f_1$

210—free space of the stack

220—area of local variables to be saved

DESCRIPTION—FIGS. 1–6—PREFERRED EMBODIMENT

Most computer programs are written in high-level languages that are used as input to compilers that produce code, including data objects called local variables and run time variables. The storage management of these different variable types is an important component in program execution and efficiency.

Figure 1:
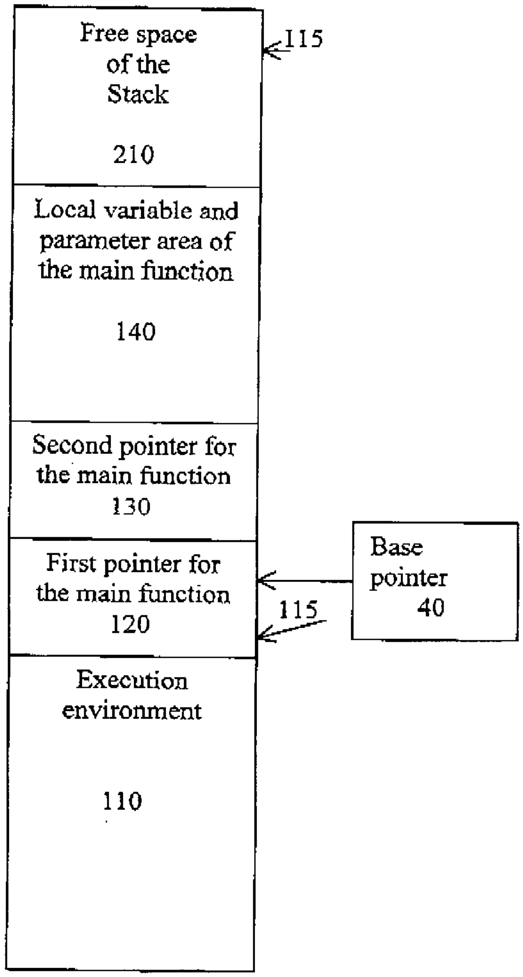
FIG. 1 shows a storage stack with only the main routine existing in memory and no function calls.

A preferred embodiment of the invention is shown in FIG. 1. A two-stack memory for IBM PC and compatible computers comprises two areas. An execution environment 110 is used to hold register values. The stack pointer register SP (ESP) is used to reference the addresses in execution environment 110. Execution environment 110 makes use of the instructions PUSH, POP, and CALL. A local variable and parameter area for all functions 115 is incorporated within the stack structure to hold local variables and parameters of all functions. At the time when the main function or procedure is active, a local variable and parameter area of the main function 140 is established in local variable and parameter area for all functions 115. A first pointer of the main function 120 and a second pointer of the main function 130 set apart execution environment 110 from a local variables and parameters area of the main function 140. Pointers 120 and 130 each consist of one word (16 bits) for 16-bit assembly language, or one doubleword (32 bits) for 32-bit assembly language. A base pointer 40 is used to reference first pointer of the main function 120. Second pointer of the main function 130 references a free space of the stack 210.

Figure 2:
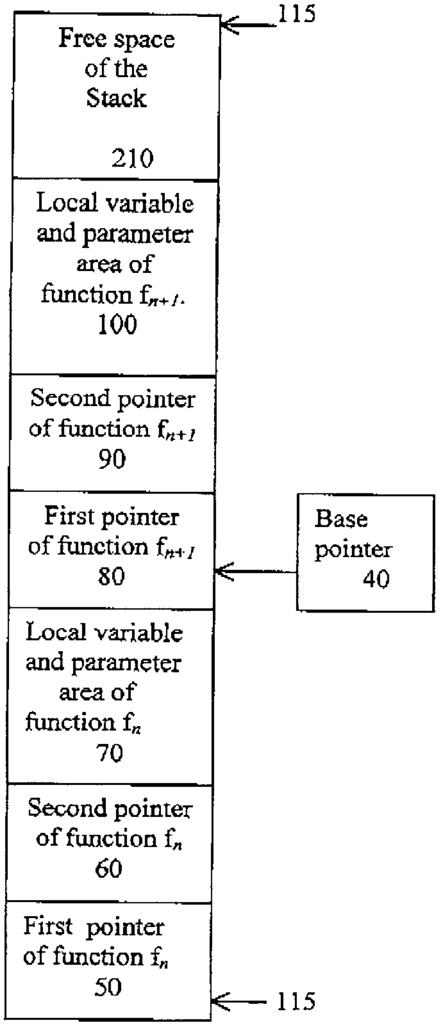
FIG. 2 shows a typical storage stack for routines $f_n$ and $f_{n+1}$ with n function calls.
Figure 3:
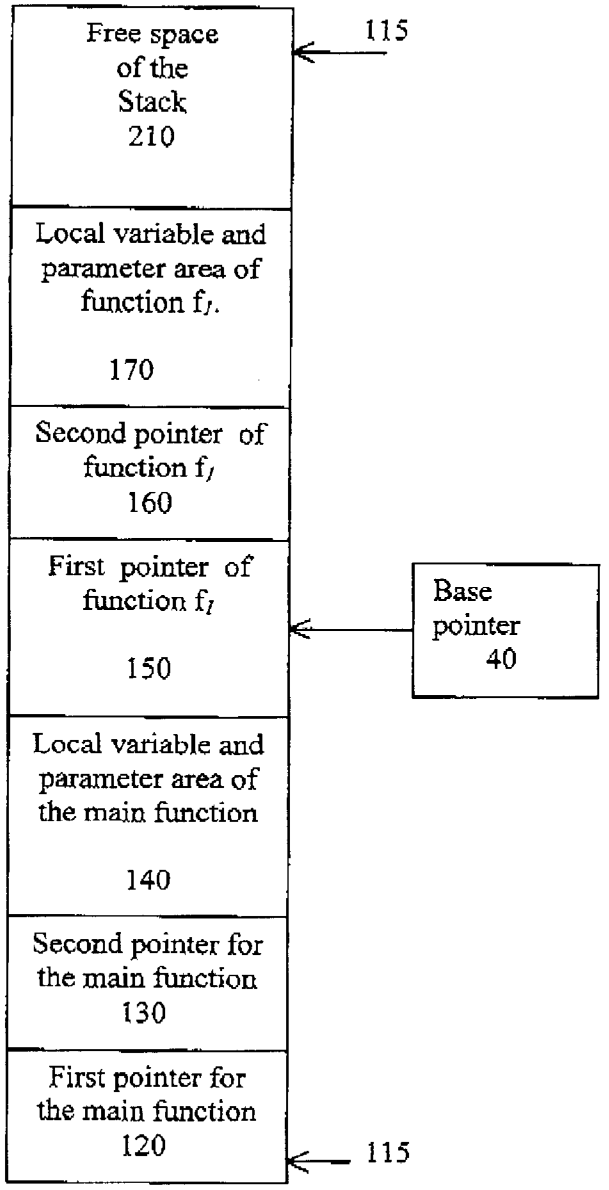
FIG. 3 shows the storage situation as given in FIG. 2 with a single function call (n=1).

FIG. 2 shows the stack structure when the $(n+1)^{st}$ function is the currently active function. This situation occurs after the original main procedure makes a function call followed by n+m consecutive function calls and m returns. Taken together a first pointer of function $f_n$ 50 containing BP (EBP) for function $f_{n-1}$, a second pointer of function $f_n$ 60 containing the value of BP (EBP) for function $f_{n+1}$, and a local variable and parameter area for function $f_n$ 70 comprise the stack region for calling function $f_n$. Taken together a first pointer of function $f_{n+1}$ 80, a second pointer of function $f_{n+1}$ 90, and a local variable and parameter area of function $f_{n+1}$ 100 comprise the stack region for called function $f_{n+1}$. The address of first pointer of function $f_n$ 50 is referenced by first pointer of function $f_{n+1}$ 80. The address of second pointer of function $f_{n+1}$ 90 is referenced by second pointer of function $f_n$ 60. Second pointer of function $f_{n+1}$ 90 contains the address of the first location of free space of the stack 210. Base pointer 40 references first pointer of function $f_{n+1}$ 80. As an example, if the main procedure called the first function, the corresponding stack configuration would be as shown in FIG. 3. Base pointer 40 now references a first pointer of function $f_n$ 150. First pointer of function $f_1$ 150, a second pointer of function $f_1$ 160, and a local variable and parameter area of function $f_1$ 170 comprise the stack region of function $f_1$. First pointer of the main function 120 is referenced by first pointer of function $f_1$ 150 and the address of first pointer of function $f_1$ 150 is referenced by second pointer of the main function 130. Second pointer of function $f_1$ 160 references free space of the stack 210.

First pointer of the main function 120 is never given a value and is never used for addressing. It exists for two purposes. The first is to have the address for base pointer 40 when the main function is currently active. The second is to maintain uniformity of the stack structure of all functions including main.

Figure 4:
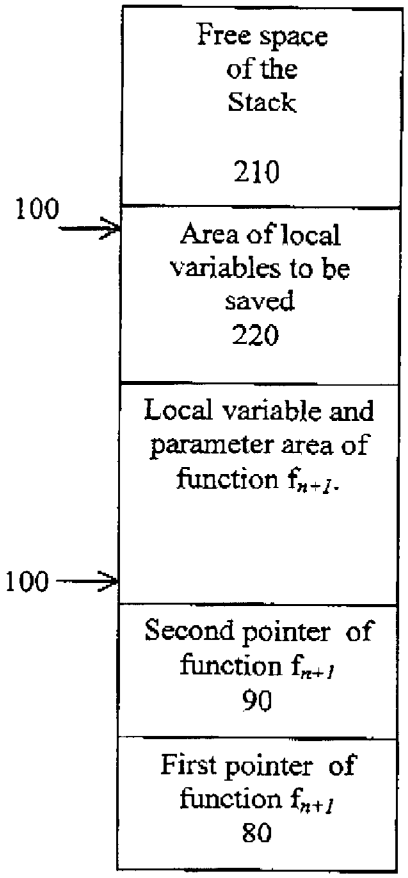
FIG. 4 shows the storage stack area at the time when the portion of local variables to be transported is at the top of the stack.
Figure 5:
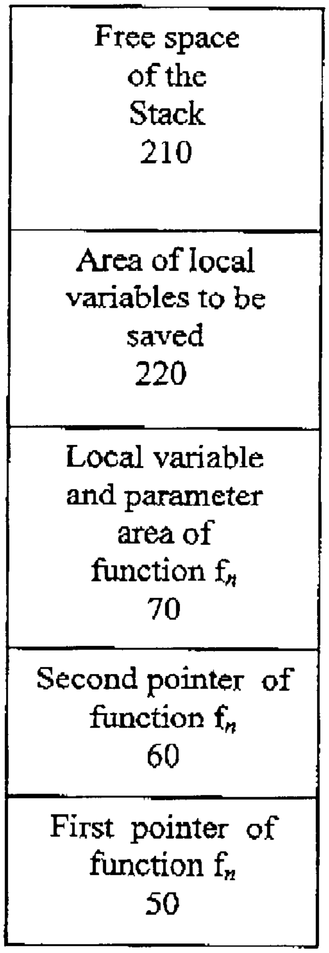
FIG. 5 shows the storage stack area at the time when run time variables have been transported.

FIG. 4 shows local variable and parameter area of function $f_{n+1}$ 100 and an area of local variables to be saved 220. Variables in 220 were created during run time. FIG. 5 shows the area of function $f_n$ at the time when area of local variables to be saved 220 have been relocated. It is a requirement that no pointer within the program references variables in 220.

Figure 6:
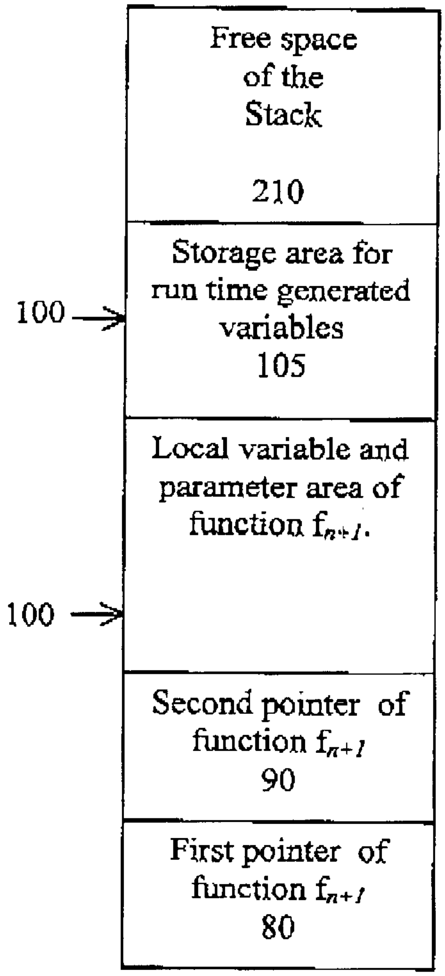
FIG. 6 shows the storage stack area at the time when run time variables have been created.

FIG. 6 shows local variable and parameter area of function $f_{n+1}$ 100 where a storage area for run time generated variables 105 has been created.

Advantages

From the description above a number of advantages of two-stack memory become evident.

(a) It is possible to create and remove run time variables in the stack area at any time during program execution.

(b) Manipulation of the created variables is the same as manipulation with other variables.

(c) When returning from a function call, all variables including those created at run time disappear (are removed) from memory automatically without any storage fragmentation.

(d) Garbage collection is not necessary.

(e) Variables of a function that are created at compile time may be deleted during run time while the function is active.

Operation—FIGS. 1–6

It is possible to create a two-area stack in an IBM PC-compatible computer using for example, in 16-bit assembly language, the sequence of instructions:

```
.MODEL SMALL
.STACK 1000H
    :
    :
.CODE
MOV SP, 100H
MOV BP, SP
```

Here execution environment 110 occupies 100H bytes, and local variable and parameter area for all functions 115 uses 1000H–100H=F00H bytes (FIG. 1). In order to load the main function into storage it is necessary to place in second pointer of the main function 130 that is referenced as [BP+2] four more than the number of bytes of all variables of the main function. This procedure creates local variable and parameter area of the main function 140. If run time variables have to be created, it is necessary to add the number of bytes required by these variables to the value of second pointer of the main function 130. This procedure increases the size of local variable and parameter area of the main function 140. If run time variables have to be deleted, it is necessary to subtract the number of bytes occupied by these variables from the value of second pointer of the main function 130. This procedure decreases the size of local variable and parameter area of the main function 140 so that second pointer of the main function 130 always references free space of the stack 210. If compile time created variables have to be deleted the same procedure of subtraction from the value of second pointer of the main function 140, must be done.

Before the main function calls a function $f_1$ (FIG. 3), which may be the first function call, it is necessary to place in the value of second pointer of function $f_1$ 160, four more than the number of bytes occupied by parameters of function $f_1$. This procedure creates a part of local variable and parameter area of the function $f_1$ 170 occupied by parameters. Every address in this area including the address of second pointer of function $f_1$ 160 may be accessed from the main function using the value in second pointer of the main function 130. Therefore the main function can load the value of second pointer of function $f_1$ 160 and values of parameters. Then it is necessary to place the address of first pointer 120 which is the current value of base pointer 40 (100H in this example) into the first storage word of free space area 210. This operation creates first pointer of function $f_1$ 150. After the call base pointer 40 must be placed at the address of first pointer of function $f_1$ 150. Function $f_1$ has to add to the value of second pointer of function $f_1$ 160 number of bytes occupied by local variables. This procedure creates the entire local variable and parameter area of function $f_1$ 170. Changing the value of second pointer of function $f_1$ 160 at run time creates and deletes variables like the previously described procedure for the main function. In order to return to the main function the value in the first pointer of function $f_1$ must be placed into base pointer 40. All of the procedures described for function $f_1$ are also performed by every function call as given by the following case for function $f_{n+1}$. (FIG. 2)

In order to call function $f_{n+1}$ the calling function $f_n$ has to place in the first pointer of function $f_{1+1}$ 80 the current value of BP. If the calling function is the main function, the current value of BP for our example is 100H. The address of the first pointer of function $f_{n+1}$ 80 is held in second pointer of function $f_n$ 60. It is then necessary to place in the second pointer of function $f_{n+1}$ 90 the starting address of free space of the stack 210. This operation can be performed in three steps. First it is necessary to place in the second pointer of function $f_{n+1}$ 90 the contents of the second pointer of function $f_n$ 60 plus the total number of bytes in pointers 80 and 90. (For 16-bit assembly language the number of bytes in pointers 80 and 90 is four. For 32-bit assembly language the number of bytes is eight.) In the second step it is necessary to add to the second pointer of function $f_{n+1}$ 90 the total number of bytes to be occupied by parameters used by function $f_{n+1}$. The first and second steps are to be done by the calling function $f_n$. Every address in this area including the address of second pointer of function $f_{n+1}$ 90 may be accessed from function $f_n$ using the value in second pointer of function $f_n$ 60. Therefore function $f_n$ can load the value of second pointer of function $f_{n+1}$ 90 and values of parameters.

Prior to the third step it is necessary to place into base pointer 40 the address of the first pointer of function $f_{n+1}$ 80. Since this address is written in the second pointer of function $f_n$ 60 the corresponding code for 16-bit assembly language is:

```
MOV BP, [BP+2]
```

During the third step it is necessary to add to the second pointer of function $f_{n+1}$ 90 the size of the local variables in bytes. This step has to be done by the called function $f_{n+1}$. Consequently the second pointer of function $f_{n+1}$ 90 refers to the first location of free space of the stack 210. If function $f_{n+1}$ calls another function $f_{n+2}$ the same steps will be repeated.

If it is required to create run-time variables occupying n bytes, it is possible to add n to the second pointer of function $f_{n+1}$ 90. This operation increases local variable and parameter area of function $f_{n+1}$ 100 and creates storage for run time generated variables 105 (FIG. 6). Any location in storage for run time generated variables 105 can be accessed using addresses [BP+k], where k is some number. This is the same technique as used in referencing variables created during compile time.

In order to delete variables in 105 it is necessary to subtract n from the second pointer of function $f_{n+1}$ 90, where n is the number of bytes to be deleted. After subtracting, variables continue to exist, but occupy free area of the stack 210. They disappear after the calling of function $f_{n+2}$. The same subtraction algorithm can be used to delete compile time created variables. When the called function $f_{n+1}$ completes and returns control to the calling function $f_n$, it is necessary to place into base pointer 40 the address of the first pointer of function $f_n$ 50. Since the address of the first pointer of function $f_n$ 50 is stored in the first pointer of function $f_{n+1}$ 80, and base pointer 40 references the first pointer of function $f_{n+1}$ 80, the corresponding instruction is MOV BP, [BP]. In this case all variables, both compile and run-time, disappear from memory because second pointer of function $f_n$ 60 references the same location as prior to the calling of function $f_{n+1}$. If any part of storage for run time generated variables 105 needs to be saved, it will be necessary to add this part to the calling function $f_n$. For this to be achieved the function $f_{n+1}$ has to place the contents of the first pointer of function $f_{n+1}$ 80 into the execution environment by performing the instruction PUSH [BP]. After the instruction is executed, area 220 (FIG. 4) is shifted occupying storage beginning with the address of the first pointer of function $f_{n+1}$ 80 which no longer exists and disappears (FIG. 5). In order to restore the address in base pointer 40 to reference the first pointer of function $f_n$ 50 it is necessary to perform the instruction POP BP.

It is then necessary to increment the value in second pointer of function $f_n$ 60 by the number of bytes used by 220, so that local variable and parameter area of function $f_n$ 70 is increased, and the function f, can now use run-time variables created by function $f_{n+1}$. Furthermore, area 220 may be added to function $f_{n-1}$ using the same routine as described above for function $f_n$. In order to perform the described shift no pointer(s) within the program may reference variables in 220, otherwise the value of the pointer(s) will be invalid.

Conclusions, Ramifications, and Scope

As can be seen from the above description the two-stack memory allows a program to create and remove run-time variables in the stack area. We are also able to manipulate the created variables in the same manner as other variables. Additionally, when returning from a function call all variables including those created at run-time can be removed from memory, however they can be saved if needed.

Even though the above description contains many specificities, these should not be construed as limiting the scope of the invention but as merely providing an illustration of the preferred embodiment. For example, the first and second pointers can be disposed not only in the lowest addresses of the function area but may occupy other addresses in that area. Additionally, the embodiment is not limited to IBM PC type machines and 16-bit architecture but may be incorporated by other microcomputers, minicomputers, mainframes, and supercomputers.

We claim:

1. A two area stack for storing execution environment, parameters and local variables created during either compilation or run-time, comprising of an execution environment area, a local variable and parameter area of all functions, and a base pointer, where said local variable and parameter area of all functions contains a local variable and parameter area of every active function $f_n$ and said local variable and parameter area of every function $f_n$ contains a first pointer that references a first pointer of function $f_{n-1}$, and a second pointer that references a first pointer of function $f_{n+1}$, and a second pointer of a currently active function references free space of the two area stack and said base pointer references a first pointer of said currently active function, whereby it is possible to create run-time local variables in the stack.

2. The two area stack of claim 1 wherein said first pointer and said second pointer are disposed in the lowest memory locations of said local variable and parameter area of every active function $f_n$.

3. The two area stack of claim 1 wherein said base pointer is a register.

4. The method of claim 1 further comprising the steps of:

(a) providing placement into said first pointer of function $f_{n+1}$ the value of said first pointer of function $f_n$, (b) providing placement into said second pointer of function $f_{n+1}$ the sum of said second pointer of function $f_n$, a number of bytes occupied by said first and second pointers, and a number of bytes of parameters supplied by function $f_n$, (c) providing placing into said base pointer the contents of said first pointer of function $f_{n+1}$, (d) providing an increment to said second pointer by a number of bytes of local variables supplied by function $f_{n+1}$, (e) providing an increment to said second pointer of said currently active function a number of bytes of run-time variables to be created, (f) providing a decrement from said second pointer of said currently active function the number of bytes of run-time variables to be deleted, (g) providing a decrement from said second pointer of said currently active function the number of bytes of compile time variables to be deleted.

5. The method of claim 1 further comprising the step of return providing placement into said base pointer the value of said first pointer of said currently active function.

6. The method of claim 5 further comprising the steps of:

(a) providing saving said first pointer of function $f_{n+1}$ in said execution environment area, (b) providing shift of run-time created variables to the lowest addresses in said variable area of function $f_{n+1}$, (c) providing increment to said second pointer of function $f_n$ by the number of bytes of run-time variables to be transported, (d) providing placement into said base pointer the saved value of said first pointer of function $f_{n+1}$.

* * * * *